United States Patent [19]
Nicolai

[11] Patent Number: 6,082,245
[45] Date of Patent: Jul. 4, 2000

[54] APPARATUS FOR PREPARING BEVERAGES WITH END OF BREW PHASE DETECTION

[75] Inventor: Haayo Nicolai, Hoogeveen, Netherlands

[73] Assignee: U.S. Philips Corporation, New York, N.Y.

[21] Appl. No.: 09/243,717

[22] Filed: Feb. 3, 1999

[30] Foreign Application Priority Data

Feb. 9, 1998 [EP] European Pat. Off. .............. 98200397

[51] Int. Cl.⁷ ...................................................... A47J 31/00
[52] U.S. Cl. .............................. 99/282; 99/281; 99/283; 99/285
[58] Field of Search ............................... 99/280, 283, 281, 99/285, 282; 219/308, 432, 433; 392/467, 480

[56] References Cited

U.S. PATENT DOCUMENTS

| | | |
|---|---|---|
| 4,838,152 | 6/1989 | Kubicko et al. .......................... 99/280 |
| 5,283,854 | 2/1994 | Schiebelhuth .......................... 99/281 X |
| 5,402,705 | 4/1995 | Bailleux et al. ........................... 99/281 |
| 5,455,887 | 10/1995 | Dam ....................................... 99/280 X |
| 5,549,035 | 8/1996 | Wing-Chung ............................. 99/281 |

FOREIGN PATENT DOCUMENTS

0171619A1  2/1986  European Pat. Off. .

*Primary Examiner*—Reginald L. Alexander
*Attorney, Agent, or Firm*—Ernestine C. Bartlett

[57] ABSTRACT

An apparatus for preparing beverages, such as a coffee brewer, has a device for measuring the periods of time during which the heating element is switched on and off by a thermostat connected in series with the heating element. The ratio between the on period and the off period is computed. If the off period is smaller than the on period, an indication is given that there is scale deposit in the water pipe. If the off period is greater than the on period, an indication is given that brewing has finished and, optionally, the heating element may be switched off permanently.

24 Claims, 4 Drawing Sheets

APPARATUS FOR PREPARING BEVERAGES WITH END OF BREW PHASE DETECTION

BACKGROUND OF THE INVENTION

The invention relates to an apparatus for preparing beverages, comprising: a reservoir for holding water, an electric heating element for heating the water, means for the transport of heated water to an outlet opening, a thermostat for turning on and turning off the heating element, and means for measuring an off period of the heating element.

Such an apparatus, particularly a coffee maker, is known from the European Patent Application EP 0 171 619. Said known coffee maker is of the flow-type having its reservoir connected to the outlet opening via a flow pipe which is heated by the heating element. The cold water from the reservoir is heated in the flow pipe by means of the heating element and is forced to the outlet opening where the hot water comes into a coffeepot via a filter holder with ground coffee. After the reservoir has been filled with cold water and the heating element has been switched on the water is pumped from the reservoir to the coffeepot. The cold water cools the flow pipe, as a result of which the thermostat keeps the heating element turned on continuously. As soon as all the water has passed through the temperature of the flow tube rises until the thermostat cuts off the power supply to the heating element. The flow phase or pumping phase is now terminated and the keep-warm phase now begins, in which the thermostat alternately turns the heating element on and off to keep the coffee brew warm. As the scale deposit in the flow pipe increases the heat transfer to the water in the pumping phase decreases. As a result of this, the temperature of the flow pipe rises above the response temperature of the thermostat. The thermostat turns off the heating element until the flow pipe has again cooled down sufficiently by the cold water. The result is that in the case of scale deposit in the flow pipe the thermostat already exhibits a switching behavior in the pumping phase. To some extent this is not a drawback. It merely takes some more time until all the cold water has been pumped off. However, it is known to use the fact that the heating element is turned off for the first time as an indication that the pumping phase has finished. The user is then given a visual or acoustic signal that the coffee is ready. This system will fail in the case of scale deposit in a flow pipe. This is because the thermostat already begins to switch when all the cold water has not yet been pumped off. In the coffee maker known from the afore-mentioned European Patent Application this problem is tackled by comparing the off time of the heating element with an empirically established fixed time period which is characteristic of the coffee maker. On the basis of the comparison it is decided whether the coffee maker is in the pumping phase or in the keep-warm phase and action is taken in accordance with the detected phase.

A drawback of this known coffee maker is that the off time differs from apparatus to apparatus, which renders the decision about the pumping phase or keep-warm phase rather unreliable and which causes inconvenience to the user.

SUMMARY OF THE INVENTION

Therefore, it is an object of the invention to provide an apparatus for preparing beverages, particularly a coffee maker, having an improved convenience of use. To this end, the apparatus is characterized in that the apparatus further comprises:

means for measuring an on period of the heating element,
means for determining a ratio between the off period and the on period, and means for activating a mode of operation of the apparatus in response to a predetermined value of the ratio.

The invention utilizes the fact that in the pumping phase the quotient of the off time and the on time is always smaller than the predetermined value and in the keep-warm phase this quotient is always greater than the predetermined value. This appears from an analysis of a multitude of measurements to different coffee makers, not only of the flow type but also of the boil-and-brew type. Moreover, it has been found that for the predetermined value the value one can be taken, which reduces the implementation of determining the ratio to a comparison of two time periods.

On the basis of the ratio between the on time and the off time thus found various actions can be taken. If the ratio is smaller than the predetermined value the thermostat switches over in the pumping phase and there is possibly scale deposit in the apparatus. If the ratio is greater than the predetermined value the thermostat switches over in the keep-warm phase and a ready signal can be generated to indicate to the user that the coffee is ready. Instead of the ready signal, or in addition thereto, the heating element can be turned off completely, either almost immediately, as is desired for example in the case of an insulated coffee pot, or after a certain time, as is desired for example for safety reasons.

BRIEF DESCRIPTION OF THE DRAWINGS

The switching behavior of the thermostat can be determined in various manners. It is possible by measuring whether the thermostat contact is open or closed, by measuring whether or not a current flows through the heating element, or by measuring temperature changes at the flow pipe or at the heating element.

These and other aspects of the invention will be described and elucidated with reference to the accompanying drawings, in which.

In these Figures elements having the same function or purpose bear the same reference symbols.

DESCRIPTION OF THE PREFERRED EMBODIMENTS

Figure 1:
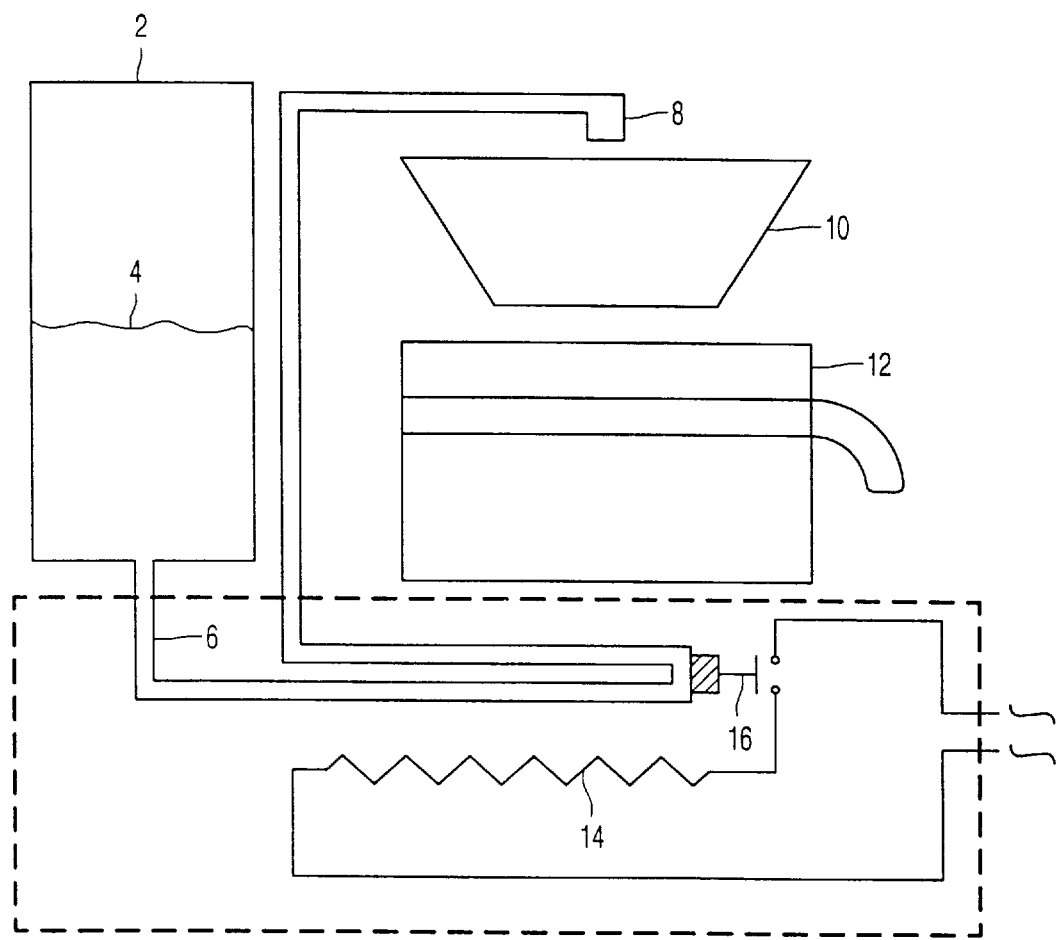
FIG. 1 diagrammatically shows a coffee maker of the flow type.

FIG. 1 shows a coffee maker of the flow type. Via a flowpipe 6 cold water 4 in a reservoir 2 is pumped to an outlet opening 8 which opens into a filter holder 10 which contains ground coffee. The coffee brew is received in a coffee pot 12. During flow or pumping phase the flow pipe 6 is heated by means of an electric heating element 14 which also keeps the coffee pot 12 warm when all the water 4 has been pumped through. As long as there is still water 4 in the flow pipe 6 the heating by means of the heating element 14 results in the water 4 being pumped to the outlet opening 8 and hot water dripping into the coffee pot 12 via the ground coffee in the filter holder 10. As soon as the water 4 in the reservoir 2 is finished the keep-warm phase begins and the flow pipe 6 is no longer cooled, as a result of which the temperature of the flow pipe 6 begins to rise. The temperature rise is detected by a thermostat 16 which is thermally coupled to the flow pipe 6 and which has an electrical contact arranged in series with the heating element 14. The contact opens when the temperature of the flow pipe 6 exceeds a first temperature and the contact closes when the temperature has decreased below a second temperature, which is generally lower than the first temperature. In the keep-warm phase the contact of the thermostat 16 changes over continually between the open state and the closed state.

The thermostat 16 can be constructed as an electromechanical switch having contacts actuated by a bimetal or as a fully electronic temperature controller based on a temperature sensor and an electronic device for controlling the heating element 14.

Figure 2:
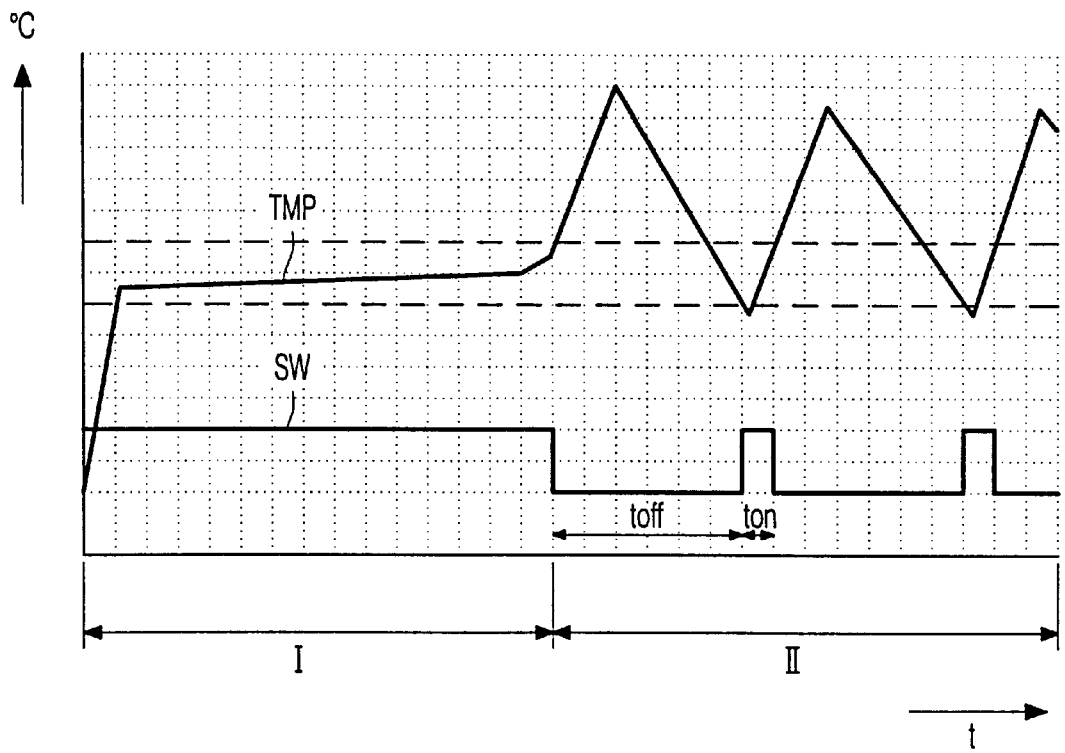
FIG. 2 represents the switching behavior of the thermostat in the case of a slight or no scale deposit in the flow pipe of the coffee maker shown in FIG. 1.

FIG. 2 represents the switching behavior of the thermostat 16 under normal circumstances in which the flow pipe 6 is cooled to such an extent by the influx of cold water 4 that the contact of the thermostat 16 never opens in the pumping phase I and the temperature TMP of the flow pipe 6 is substantially constant. Upon termination of the pumping phase I the temperature rises comparatively rapidly and the keep-warm phase II begins, in which phase the thermostat 16 switches on and off and the temperature TMP fluctuates between two values. The switching behavior of the thermostat 16 is represented by means of a bivalent signal SW, the off periods being indicated by toff and the on periods by ton. In the keep-warm phase II the off period toff is longer than the on period ton.

Figure 3:
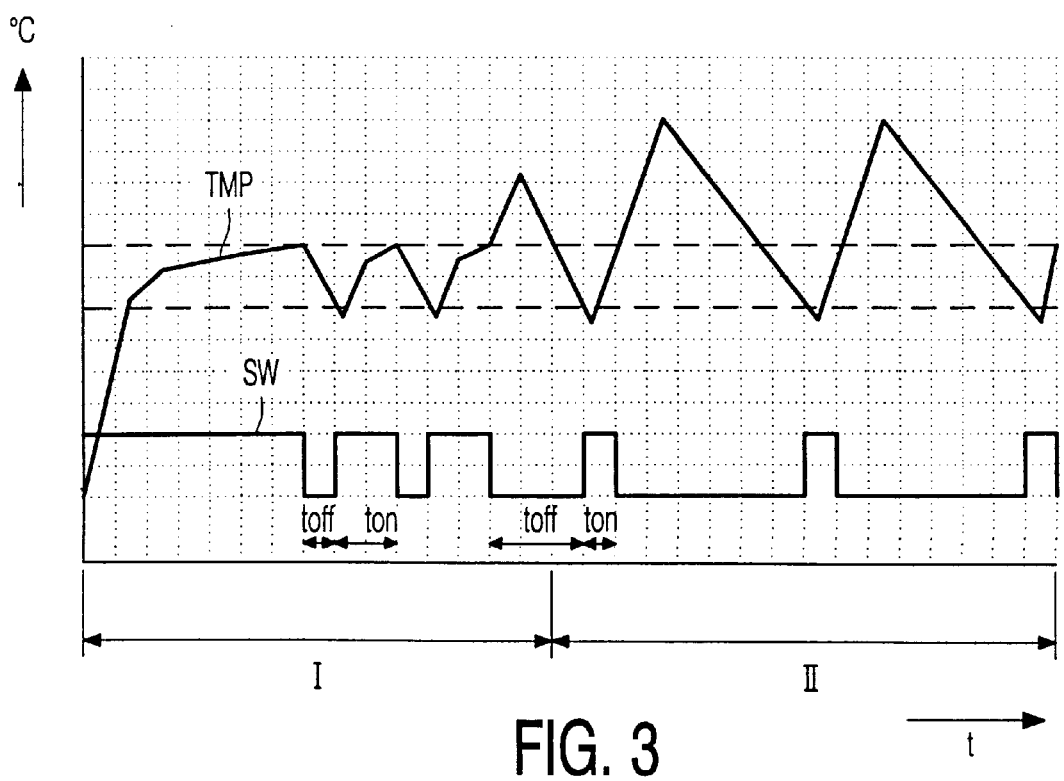
FIG. 3 represents the switching behavior of the thermostat in the case of excessive scale deposit in the flow pipe of the coffee maker shown in FIG. 1.

FIG. 3 represents the switching behavior of the thermostat 16 under circumstances in which the flow pipe 6 is clogged by scale deposit to such an extent that the heat transfer to the cold water 4 is inadequate and the flow pipe 6 becomes so hot that the thermostat 16 opens the contact and turns off the heating element 14. However, as a result of the influx of cold water 4 the thermostat 16 cools rapidly and the contact is closed again. Now the thermostat 16 already begins to change over continually in the pumping phase I but as a result of the rapid cooling the off period toff is shorter than the on period ton. Under these circumstances it will take longer before all the cold water 4 has been pumped off and eventually the keep-warm phase II begins, in which the conditions are substantially the same as in the keep-warm phase II in FIG. 2. The effect of scale deposit in the flow pipe 6 is now insignificant.

From FIGS. 2 and 3 it appears that the switching behavior of the thermostat is an indication of the phase in which the coffee-making process is. If the off period toff is shorter than the on period ton, the coffee-making process is in the pumping phase I and there is or may be scale deposit in the flow pipe 6: Situation 1. Conversely, if the off period toff is longer than the on period ton, the coffee-making process is in the keep-warm phase II: Situation 2. From the change from Situation 1 to Situation 2, or just on the basis of Situation 2, the conclusion may be drawn that the keep-warm phase II has begun and a signal can be given to indicate that the coffee is ready or that the heating element 14 can be turned off permanently, as is required in the case of coffee makers having an insulated coffee pot. On the basis of Situation 1 a signal can be given to indicate that there is scale deposit in the appliance and that de-scaling is necessary. Signalling can be effected visually, for example by means of a flashlight or by means of a suitable indication on a display, or acoustically, for example by means of a buzzer.

Figure 4:
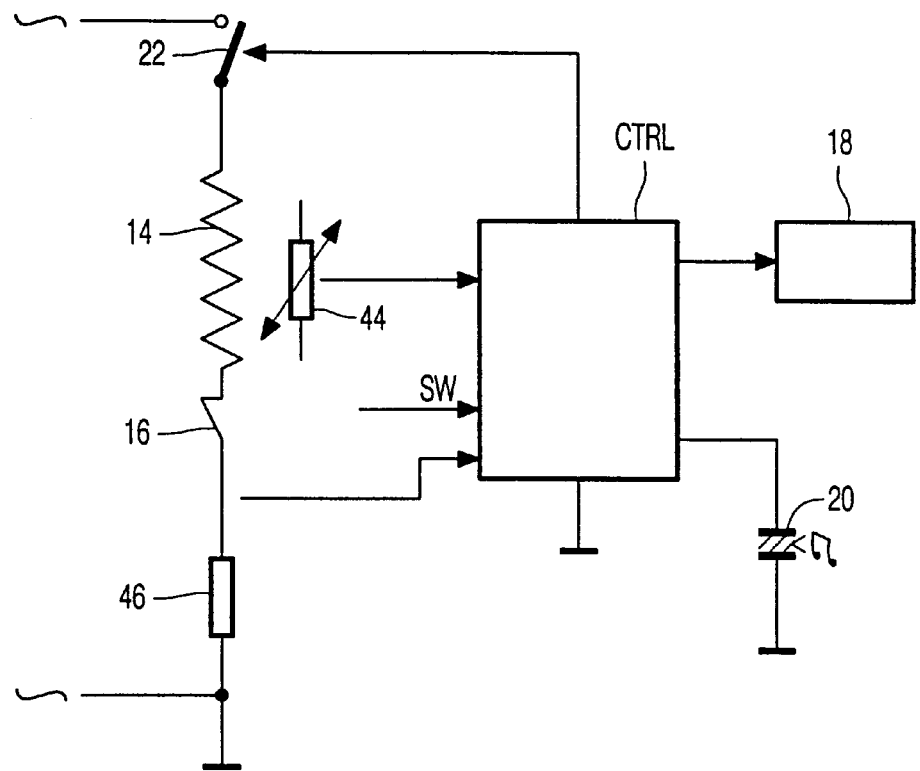
FIG. 4 shows an electrical circuit diagram of a coffee maker in accordance with the invention.

FIG. 4 shows the electrical circuit diagram of a coffee maker in accordance with the invention. The voltage across the thermostat 16 is monitored by a control unit CTRL. The absence or presence of voltage is comparable to the inverse of the signal SW in FIGS. 2 and 3. No voltage or a low voltage indicates that the contact of the thermostat 16 is closed; otherwise, the contact is open. The control unit CTRL measures the on period ton and the off period toff of the thermostat 16, calculates the ratio between these two time periods, drives a visual display 18 or a buzzer 20 in dependence upon the calculated ratio, or turns off the heating element 14 permanently by means of a switch 22 in series with the heating element 14. Instead of a variation of the voltage across the contact of the thermostat 16 it is possible to measure a variation of the current through the heating element 14 by means of a sensing resistor 46 in series with the heating element 14 or by means of a current transformer (not shown).

Figure 5:
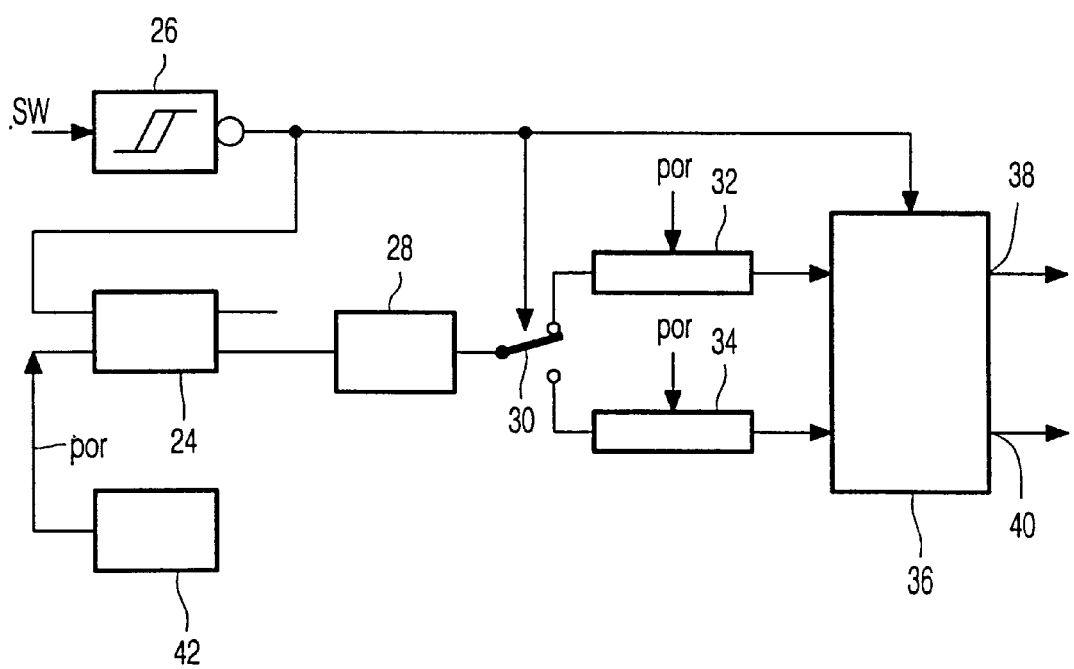
FIG. 5 shows an electrical block diagram of an electronic control unit for use in the coffee maker shown in FIG. 4.

FIG. 5 shows the block diagram of a possible implementation of the time measuring and calculating section of the control unit CTRL. The first time that the contact of the thermostat opens a flip-flop 24 is triggered via a buffer 26 which is controlled by a signal comparable to the signal SW. As a result of this, an output of the flip-flop 24 triggers a 1 Hz oscillator 28 whose counting pulses are applied to a first counter 32 via a change-over switch 30 for the one value of the signal SW and to a second counter 34 via said switch for the other value of the signal SW. The first counter 32 thus counts the number of seconds that the contact of the thermostat 16 is open (toff) and the second counter 34 counts the number of seconds that the contact of the thermostat 16 is closed (ton). The counts of the two counters are compared with one another in a logic comparator 36 and at the instant at which the contact of the thermostat 16 opens again the outputs 38, 40 give an indication whether the aforementioned Situation 1 or Situation 2 occurs. The flip-flop 24, the first counter 32 and the second counter 34 are reset by a signal por from a system power-up reset unit 42. The analysis of the on periods and the off periods can also be effected by means of software with a microcontroller under control of a suitable program.

Figure 6:
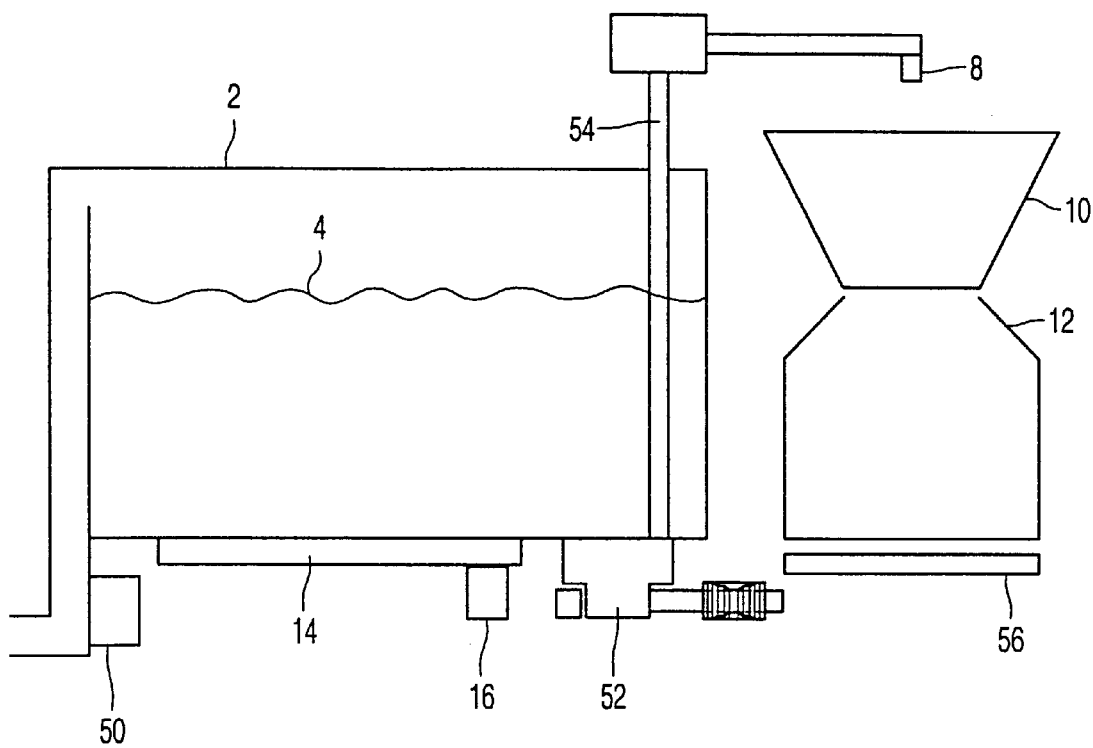
FIG. 6 diagrammatically shows a coffee maker of the boil-and-brew type.

The invention is not limited to coffee makers of the flow-type. FIG. 6 shows a coffee maker of the boil-and-brew type in which the water is boiled first and is then fed to the outlet opening in a measured-out manner. The water 4 in the reservoir 2 is heated by the heating element 16 mounted against the bottom of the reservoir 2. After the water 4 has been brought to the boil, which is detected by means of a steam detector 50, it is pumped to the outlet opening 8 via a riser pipe 54 in a measured-out manner by means of an electrical pump 52. The hot water is fed into the filter holder 10 which contains the ground coffee. The coffee brew is received in the coffee pot 12, which is kept warm by means of a heating element 56. Scale deposit on the bottom of the reservoir 2 reduces the transfer of heat to the water 4, as a result of which the thermostat 16 will exhibit a switching behavior similar to that in a coffee maker of the flow type.

The invention is also not limited to coffee makers but can also be used for making tea or any other beverage.

What is claimed is:

1. An apparatus for preparing beverages, comprising: a reservoir for holding water, an electric heating element for heating the water, means for the transport of heated water to an outlet opening, a thermostat for turning on and turning off the heating element, and means for measuring an off period of the heating element, wherein the apparatus further comprises:

means for measuring an on period of the heating element, means for determining a ratio between the off period and the on period, and means for activating a mode of operation of the apparatus which comprises a pumping phase or a keep-warm phase in response to a comparison of the value of said ratio to a predetermined value.

2. An apparatus for preparing beverages as claimed in claim 1, wherein the predetermined value is substantially equal to unity.

3. An apparatus for preparing beverages as claimed in claim 1, wherein the means for activating include a signalling means for indicating scale deposit in the means for transport when the ratio between the off period and the on period is smaller than the predetermined value.

4. An apparatus for preparing beverages as claimed in claim 1, wherein the means for activating include a signalling means for indicating completion of the transport of water through the means for transport when the ratio between the off period and the on period is greater than the predetermined value.

5. An apparatus for preparing beverages as claimed in claim 1, wherein the means for activating include a device for turning off the heating element when the ratio between the off period and the on period is greater than the predetermined value.

6. An apparatus for preparing beverages as claimed in claim 1, wherein the means for measuring the on period and the off period include means for measuring a variation of a voltage across a switching contact of the thermostat.

7. An apparatus for preparing beverages as claimed in claim 1, wherein the means for measuring the on period and the off period include means for measuring a variation of a current through the heating element.

8. An apparatus for preparing beverages as claimed in claim 1, wherein the means for measuring the on period and the off period include means for measuring a temperature variation of the means for transport or the heating element.

9. An apparatus for preparing beverages as claimed in claim 2, wherein the means for activating include a signalling means for indicating scale deposit in the means for transport when the ratio between the off period and the on period is smaller than the predetermined value.

10. An apparatus for preparing beverages as claimed in claim 2, wherein the means for activating include a signalling means for indicating completion of the transport of water through the means for transport when the ratio between the off period and the on period is greater than the predetermined value.

11. An apparatus for preparing beverages as claimed in claim 2, wherein the means for activating include a device for turning off the heating element when the ratio between the off period and the on period is greater than the predetermined value.

12. An apparatus for preparing beverages as claimed in claim 2, wherein the means for measuring the on period and the off period include means for measuring a variation of a voltage across a switching contact of the thermostat.

13. An apparatus for preparing beverages as claimed in claim 3, wherein the means for measuring the on period and the off period include means for measuring a variation of a voltage across a switching contact of the thermostat.

14. An apparatus for preparing beverages as claimed in claim 4, wherein the means for measuring the on period and the off period include means for measuring a variation of a voltage across a switching contact of the thermostat.

15. An apparatus for preparing beverages as claimed in claim 5, wherein the means for measuring the on period and the off period include means for measuring a variation of a voltage across a switching contact of the thermostat.

16. An apparatus for preparing beverages as claimed in claim 2, wherein the means for measuring the on period and the off period include means for measuring a variation of a current through the heating element.

17. An apparatus for preparing beverages as claimed in claim 2, wherein the means for measuring the on period and the off period include means for measuring a temperature variation of the means for transport or the heating element.

18. An apparatus for preparing beverages as claimed in claim 3, wherein the means for measuring the on period and the off period include means for measuring a variation of a current through the heating element.

19. An apparatus for preparing beverages as claimed in claim 4, wherein the means for measuring the on period and the off period include means for measuring a variation of a current through the heating element.

20. An apparatus for preparing beverages as claimed in claim 5, wherein the means for measuring the on period and the off period include means for measuring a variation of a current through the heating element.

21. An apparatus for preparing beverages as claimed in claim 2, wherein the means for measuring the on period and the off period include means for measuring a temperature variation of the means for transport or the heating element.

22. An apparatus for preparing beverages as claimed in claim 3, wherein the means for measuring the on period and the off period include means for measuring a temperature variation of the means for transport or the heating element.

23. An apparatus for preparing beverages as claimed in claim 4, wherein the means for measuring the on period and the off period include means for measuring a temperature variation of the means for transport or the heating element.

24. An apparatus for preparing beverages as claimed in claim 5, wherein the means for measuring the on period and the off period include means for measuring a temperature variation of the means for transport or the heating element.

* * * * *